(12) United States Patent
Chou et al.

(10) Patent No.: US 12,373,563 B2
(45) Date of Patent: Jul. 29, 2025

(54) COMPUTER SYSTEM FOR FAILING A SECURE BOOT IN A CASE TAMPERING EVENT

(71) Applicant: Moxa Inc., New Taipei (TW)

(72) Inventors: Chia-Te Chou, New Taipei (TW);
Tsung-Yi Lin, New Taipei (TW);
Yoong Tak Tan, New Taipei (TW);
Hsin-Ju Wu, New Taipei (TW);
Jian-Yu Liao, New Taipei (TW);
Che-Yu Huang, New Taipei (TW);
Tsung-Li Fang, New Taipei (TW);
Kuo-Chen Wu, New Taipei (TW);
Chih-Yu Chen, New Taipei (TW)

(73) Assignee: Moxa Inc., New Taipei (TW)

( * ) Notice: Subject to any disclaimer, the term of this patent is extended or adjusted under 35 U.S.C. 154(b) by 351 days.

(21) Appl. No.: 17/565,458

(22) Filed: Dec. 30, 2021

(65) Prior Publication Data

US 2023/0214492 A1    Jul. 6, 2023

(51) Int. Cl.
*G06F 21/57* (2013.01)
*H04L 9/32* (2006.01)

(52) U.S. Cl.
CPC .......... *G06F 21/575* (2013.01); *H04L 9/3239* (2013.01); *G06F 2221/034* (2013.01)

(58) Field of Classification Search
CPC .. G06F 21/575; G06F 2221/034; G06F 21/86; G06F 7/588; G06F 21/602; H04L 9/3239
See application file for complete search history.

(56) References Cited

U.S. PATENT DOCUMENTS

| | | | |
|---|---|---|---|
| 2003/0120923 A1* | 6/2003 | Gilman | G06F 21/10 713/170 |
| 2007/0220500 A1* | 9/2007 | Saunier | G06F 21/575 717/162 |
| 2012/0102580 A1 | 4/2012 | Bealkowski | |
| 2013/0013906 A1* | 1/2013 | Brown | G06F 9/4403 713/2 |
| 2013/0173898 A1 | 7/2013 | Berg | |
| 2014/0237261 A1* | 8/2014 | Diep | G06F 12/1408 713/189 |

(Continued)

FOREIGN PATENT DOCUMENTS

| TW | 201935301 A | 9/2019 |
|---|---|---|
| TW | 202027450 A | 7/2020 |

*Primary Examiner* — Abu S Sholeman
(74) *Attorney, Agent, or Firm* — Winston Hsu

(57) ABSTRACT

A computer system for failing a secure boot in a case tampering event comprises a microcontroller unit (MCU); a trusted platform module (TPM), for generating random bytes for a secure boot of the computer system; a bootloader, for storing information comprising the random bytes in the MCU and at least one hardware of the computer system and performing the secure boot, wherein the TPM is comprised in the bootloader; an operating system (OS), for performing the secure boot; and at least one sensor, coupled to the MCU, for detecting a case tampering event, and transmitting a signal for triggering a deletion of the random bytes, if the case tampering event happens. The MCU performs the operation of deleting the random bytes stored in the MCU and the at least one hardware according to a power supply, in response to the signal.

10 Claims, 4 Drawing Sheets

(56) References Cited

U.S. PATENT DOCUMENTS

| | | |
|---|---|---|
| 2015/0365227 A1 | 12/2015 | Billau |
| 2016/0232343 A1* | 8/2016 | Post ........................ G06F 21/44 |
| 2017/0147356 A1* | 5/2017 | Kotary .................... G06F 21/72 |
| 2017/0230179 A1* | 8/2017 | Mannan ................ H04L 9/3226 |
| 2018/0007040 A1* | 1/2018 | Thom ................... G06F 21/575 |
| 2019/0080091 A1 | 3/2019 | Kim |
| 2022/0061059 A1* | 2/2022 | Dunsmore ............ H04L 9/0897 |

* cited by examiner

COMPUTER SYSTEM FOR FAILING A SECURE BOOT IN A CASE TAMPERING EVENT

BACKGROUND OF THE INVENTION

1. Field of the Invention

The present invention relates to a computer system, and more particularly, to a computer system for failing a secure boot in a case tampering event.

2. Description of the Prior Art

When a case enclosing a computer system is detected to be tampered, a mechanism of case tampering of the computer system is applied to protect data of the computer system from being tampered. However, it is still unknown how the computer system fails a secure boot in a case tampering event when the computer system is powered off. Thus, failing the secure boot in the case tampering event of the computer system when the computer system is powered off is a problem to be solved.

SUMMARY OF THE INVENTION

The present invention therefore provides a method of failing a secure boot in a case tampering event of a computer system to solve the abovementioned problem.

A computer system for failing a secure boot in a case tampering event comprises a microcontroller unit (MCU); a trusted platform module (TPM), for generating a plurality of random bytes for a secure boot of the computer system, if the MCU does not comprise the plurality of random bytes; a bootloader, for storing information in the MCU and at least one hardware of the computer system and performing the secure boot, wherein the information comprises the plurality of random bytes, and the TPM is comprised in the bootloader; an operating system (OS), for performing the secure boot; and at least one sensor, coupled to the MCU, for detecting a case tampering event in the computer system, and transmitting a signal for triggering a deletion of the plurality of random bytes, if the case tampering event happens in the computer system. The MCU performs the operation of deleting the plurality of random bytes stored in the MCU and the at least one hardware according to a power supply, to fail the secure boot, in response to the signal transmitted by the at least one sensor.

A method of failing a secure boot in a case tampering event of a computer system comprises performing a secure boot of a computer system; generating a plurality of random bytes for the secure boot, if a microcontroller unit (MCU) does not comprise the plurality of random bytes; storing information in the MCU and at least one hardware of the computer system, wherein the information comprises the plurality of random bytes; detecting a case tampering event in the computer system; transmitting a signal for triggering a deletion of the plurality of random bytes, if the case tampering event happens in the computer system; and deleting the plurality of random bytes stored in the MCU and the at least one hardware according to a power supply, to fail the secure boot, in response to the signal transmitted by the at least one sensor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
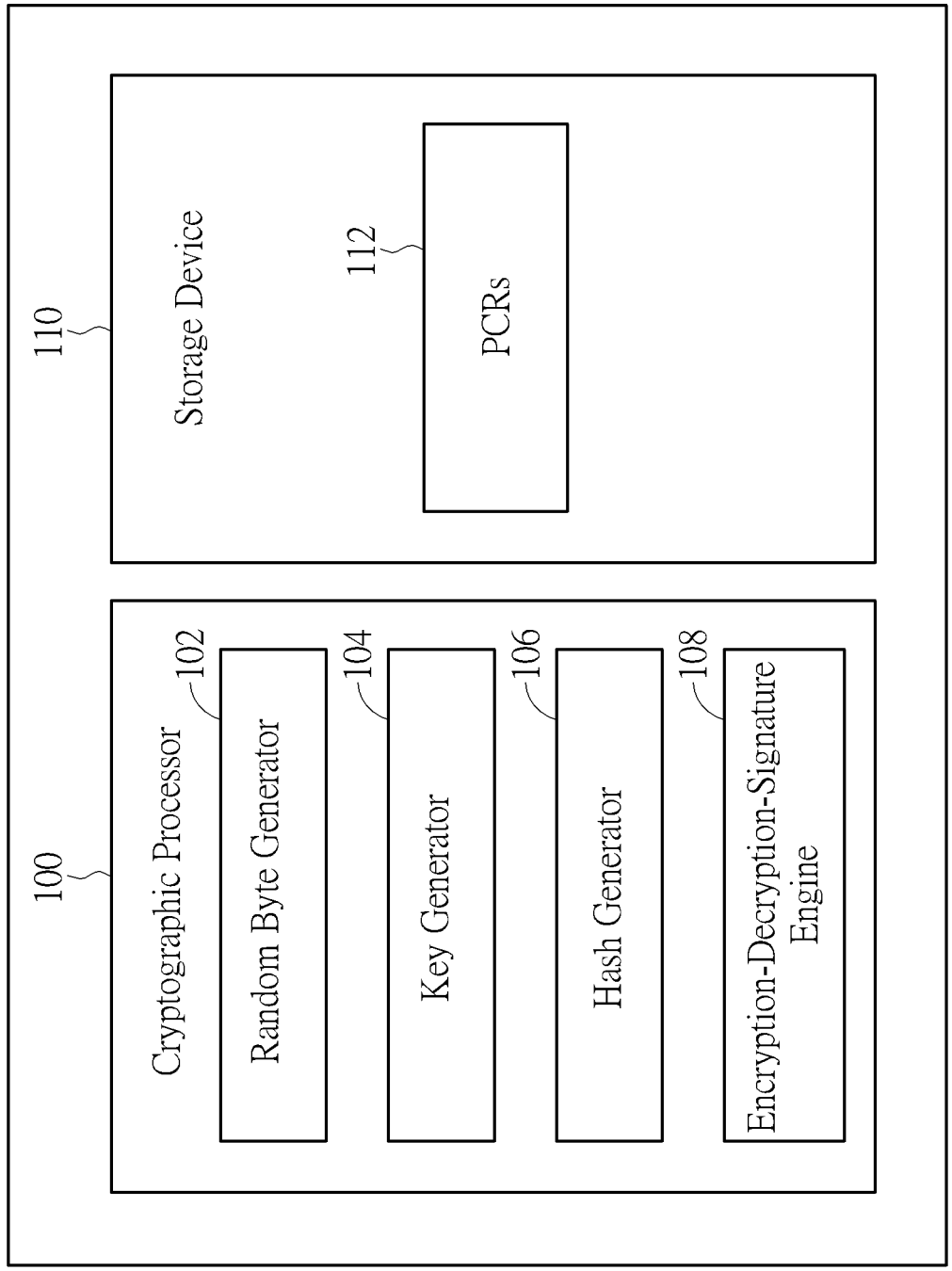
FIG. 1 is a schematic diagram of a trusted platform module (TPM) according to an example of the present invention.

FIG. 1 is a schematic diagram of a trusted platform module (TPM) 10 according to an example of the present invention. The TPM 10 is a passive hardware element which enhances security of a computer system, and is used to keep the computer system running well. The TPM 10 includes a cryptographic processor 100 and a storage device 110. The cryptographic processor 100 includes a random byte generator 102, a key generator 104, a hash generator 106 and an encryption-decryption-signature engine 108. The random byte generator 102 may generate random bytes for a secure boot. The random bytes may include numbers, alphabets, punctuations, or combination thereof. The key generator 104 may generate public keys for encryptions and private keys for decryptions. The hash generator 106 may generate hashes according to the random bytes generated by the random byte generator 102. The encryption-decryption-signature engine 108 may manage the public keys and the private keys for signings and verifications. The storage device 110 may be used to store an endorsement key (EK), a storage root key (SRK), attestation identity keys (AIKs) and storage keys. In addition, the storage device 110 includes platform configuration registers (PCRs) 112. The PCRs 112 stores the random bytes generated by the random byte generator 102, and generates the hashes according to a cryptographic hash function and the random bytes. The hashes generated according to the cryptographic hash function may be drastically different even if the random bytes (i.e., inputs of the PCRs 112) are similar.

The PCRs 112 may initiate different functions of the TPM 10 according to different hashes, and may establish a PCR policy for the TPM 10. In a boot process, the TPM 10 may store information (e.g., a central processing unit (CPU) identity (ID), a media access control (MAC) address, a serial number, a product ID, . . . etc.) in the PCRs 112, and the PCRs 112 may generate the hashes according to the above information. When the hashes are correct (i.e., the hashes generated by the PCRs 112 are the same as the hashes generated by the hash generator 106, and the TPM 10 is able to function according to the hashes), the random bytes stored in the PCRs 112 may be acquired.

Figure 2:
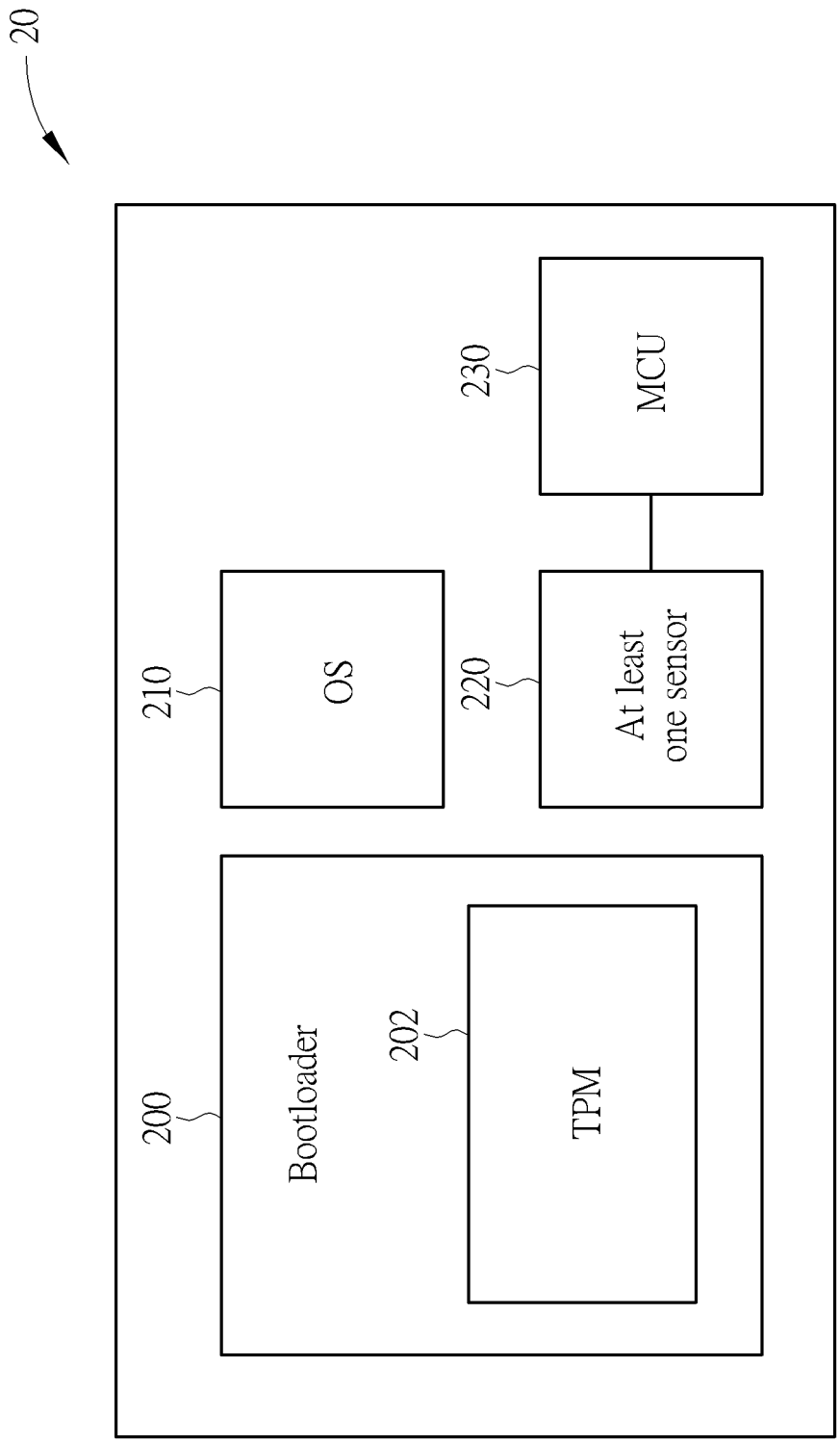
FIG. 2 is a schematic diagram of a computer system according to an example of the present invention.

FIG. 2 is a schematic diagram of a computer system 20 according to an example of the present invention. The computer system 20 includes a bootloader 200, an operating system (OS) 210, at least one sensor 220 and a microcontroller unit (MCU) 230. The bootloader 200 may be also called a basic input/output system (BIOS). The bootloader 200 performs hardware initialization in a power-on stage of the computer system 20. The bootloader 200 includes a TPM

202. The TPM 202 may be the TPM 10 described above, and is not narrated herein. The OS 210 manages hardware resource and software resource of the computer system 20, and provides services for the computer system 20. The OS 210 may be a Windows OS or a Linux OS, but is not limited thereto. The bootloader 200 and the OS 210 may apply asymmetric/symmetric keys for encryptions (e.g., using the public keys) and decryptions (e.g., using the private keys) to the entire computer system 20. The at least one sensor 220 may be configured to detect incidents (e.g., case tampering events) and to notice the bootloader 200 and/or the OS 210 of the computer system 20.

The MCU 230 may be coupled to the at least one sensor 220, and may be equipped with a power supply. When the incidents (e.g., case tampering events) happen during a power failure of the computer system 20, the power supply enables the at least one sensor 220 to detect the incidents. The MCU 230 may receive a signal from the at least one sensor 220, and may perform corresponding operations even if the computer system 20 is powered off. In addition, the bootloader 200 may store the random bytes generated by a random byte generator of the TPM 202, in the MCU 230.

Figure 3:
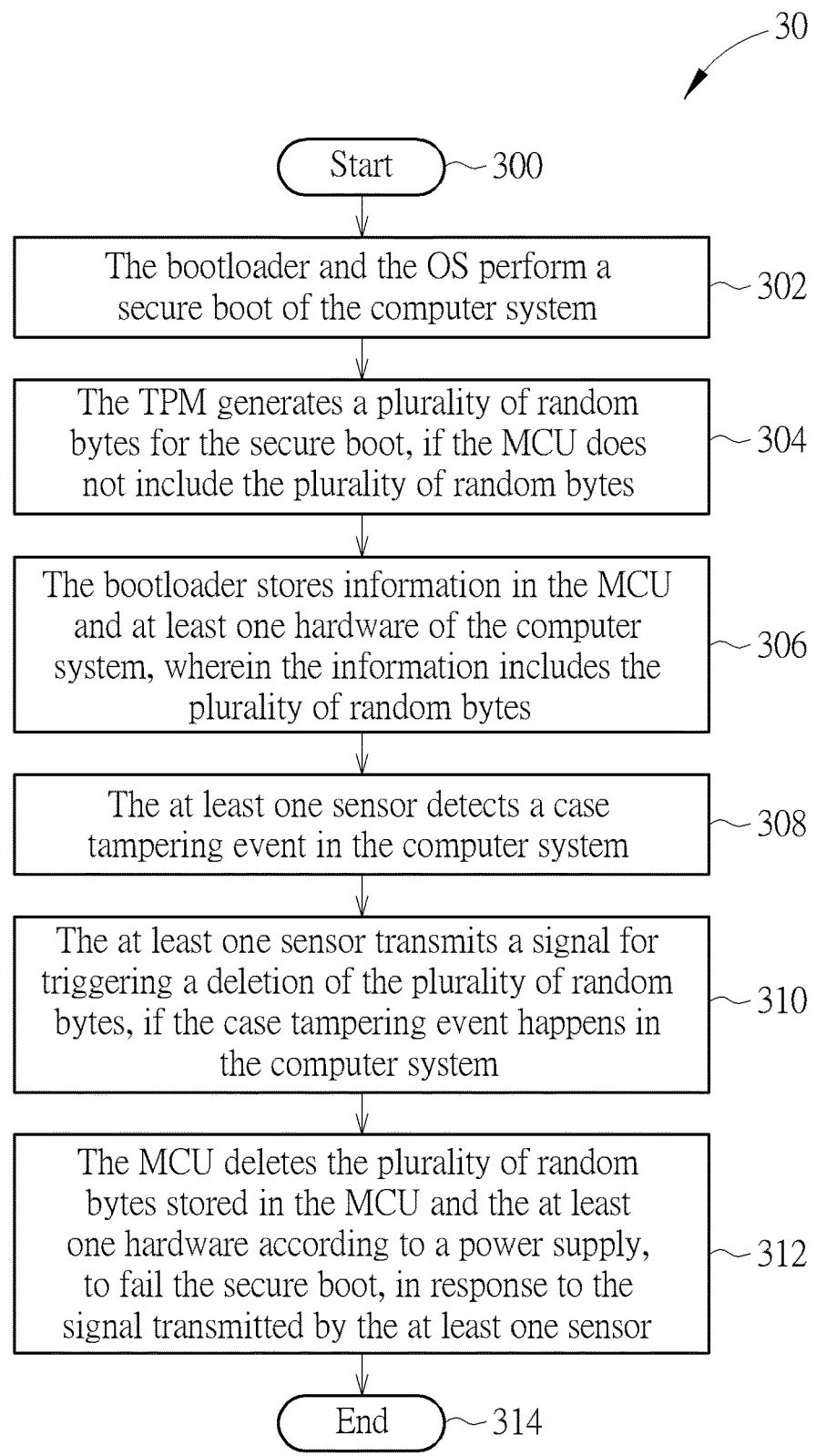
FIG. 3 is a flowchart of a process according to an example of the present invention.

FIG. 3 is a flowchart of a process 30 according to an example of the present invention. The process 30 may be utilized in the computer system 20, to detect a case tampering event. The process 30 may be complied into program codes and includes the following steps:

Step 300: Start.

Step 302: The bootloader 200 and the OS 210 perform a secure boot of the computer system 20.

Step 304: The TPM 202 generates a plurality of random bytes for the secure boot, if the MCU 230 does not include the plurality of random bytes.

Step 306: The bootloader 200 stores information in the MCU 230 and at least one hardware of the computer system 20, wherein the information includes the plurality of random bytes.

Step 308: The at least one sensor 220 detects a case tampering event in the computer system 20.

Step 310: The at least one sensor 220 transmits a signal for triggering a deletion of the plurality of random bytes, if the case tampering event happens in the computer system 20.

Step 312: The MCU 230 deletes the plurality of random bytes stored in the MCU 230 and the at least one hardware according to a power supply, to fail the secure boot, in response to the signal transmitted by the at least one sensor 220.

Step 314: End.

According to the process 30, when the secure boot is performed, whether the MCU 230 includes the plurality of random bytes may be checked (e.g., by the bootloader 200). If the MCU 230 does not include the plurality of random bytes, the plurality of random bytes are generated by the TPM 202. The bootloader 200 stores the information including the plurality of random bytes in the MCU and the at least one hardware. The at least one sensor 220 detects the case tampering event in the computer system 20. If the case tampering event happens in the computer system 20, the at least one sensor may transmit a signal for triggering the deletion of the plurality of random bytes. In a situation that the computer system 20 is powered off (or the computer system 20 encounters a power failure), the bootloader 200 and the OS 210 may not perform operations as usual. Accordingly, the MCU 230 may delete the plurality of random bytes stored in the MCU 230 and the at least one hardware according to (e.g., by using) the power supply, in response to the signal transmitted by the at least one sensor 220. The secure boot may fail (e.g., not be finished) accordingly. In other words, the MCU 230 equipped with the power supply may be a replacement for the bootloader 200 or the OS 210, if the case tampering event happens and the computer system 20 is powered off. The plurality of random bytes stored in the MCU 230 and the at least one hardware are deleted by the MCU 230 for a security of the computer system 20.

It should be noted that the plurality of random bytes generated by the TPM 202 may not be known (e.g., acquired) by external users of the computer system 20. Furthermore, even internal developers of the computer system 20 may not know (e.g., acquire) the plurality of random bytes. In other words, the plurality of random bytes can be acquired by neither the users nor the developers of the computer system 20. This mechanism prevents the computer system 20 from being tampered. In addition, when the case tampering event happens, the MCU 230 may simply delete the plurality of random bytes stored in the MCU 230 and the at least one hardware. Information other than the plurality of random bytes may not be involved and may be maintained.

In one example, the bootloader 200 and the OS 210 perform the secure boot according to the information stored in the MCU 230 and the at least one hardware. That is, if the case tampering event does not happen during the process of the secure boot, the computer system 20 completes the secure boot as a general secure boot of the computer system 20.

In one example, the MCU 230 scrambles the plurality of random bytes stored in the at least one hardware, if the case tampering event does not happens. That is, the secure boot is completed, and the plurality of random bytes stored in the at least one hardware are scrambled by the MCU 230 to prevent the OS 210 from acquiring the plurality of random bytes, if the case tampering event does not happen in the computer system 20.

In one example, the at least one hardware of the computer system 20 includes a PCR. The PCR is included in the TPM 202. The PCR generates a first plurality of hashes according to the plurality of random bytes. In one example, the secure boot of the computer system 20 may be completed, if the first plurality of hashes are correct. That is, if the plurality of random bytes are not deleted (i.e., the case tampering event does not happen), the first plurality of hashes are correct accordingly (i.e., the TPM 202 is able to function according to the first plurality of hashes). Thus, the TPM 202 is able to function, which leads to a completion of the secure boot. It should be noted that the OS 210 may be able to provide services for a user of the computer system 20, after the secure boot is completed. In one example, the secure boot of the computer system 20 may fail, if the first plurality of hashes are incorrect. That is, if the plurality of random bytes have been deleted (e.g., have been tampered), the first plurality of hashes are incorrect accordingly (i.e., the TPM 202 is unable to function according to the first plurality of hashes). Thus, the TPM 202 is unable to function, and the computer system 20 may not be able to process into the OS 210, which leads to a failure of the secure boot.

In one example, the bootloader 200 obtains the plurality of random bytes for the secure boot according to a password of the computer system 20 and the first plurality of hashes, after the secure boot fails. The bootloader 200 stores the plurality of random bytes in the MCU 230 and the at least one hardware, and resumes the secure boot according to the plurality of random bytes. That is, to resume the secure boot which fails due to the case tampering event, the plurality of random bytes are obtained from the TPM 202 if the first plurality of hashes generated by the PCR are correct. The computer system 20 identifies that the password (e.g., a BIOS password) is transmitted from the bootloader 200 to the PCR included in the TPM 202, and allows the bootloader 200 to obtain the plurality of random bytes for the secure boot, from the TPM 202. The computer system 20 may not allow the plurality of random bytes to be acquired, and the secure boot may not be resumed, if the computer system 20 identifies that the password is not transmitted from the bootloader 200 (e.g., transmitted from the OS 210), or if the password is wrong to the PCR.

In one example, the MCU 230 communicates with the bootloader 200 (of the computer system 20) according to the plurality of random bytes and a second plurality of hashes. That is, the OS 210 is not allowed to obtain the plurality of random bytes when the computer system 20 performs the secure boot. To prevent the OS 210 from acquiring the plurality of random bytes by means of a brute-force attack, the MCU 230 may use (e.g., part of) the plurality of random bytes and the second plurality of hashes when establishing a communication protocol with the bootloader 200. In other words, the MCU 230 may distinguish between the bootloader 200 and the OS 210 according to an existence of the second plurality of hashes. In one example, the second plurality of hashes may be the same as the first plurality of hashes, and may include a plurality of SHA-1 values. The plurality of SHA-1 values may be generated by the PCR comprised in the TPM 202, or may be generated by a software. The plurality of SHA-1 values may be information for the bootloader 200 and the MCU 230 to communicate with each other. In one example, the plurality of SHA-1 values may be generated simply by dividing a random byte in half, and the bootloader 200 and the MCU 230 ensure each other according to each of the plurality of SHA-1 values.

Figure 4:
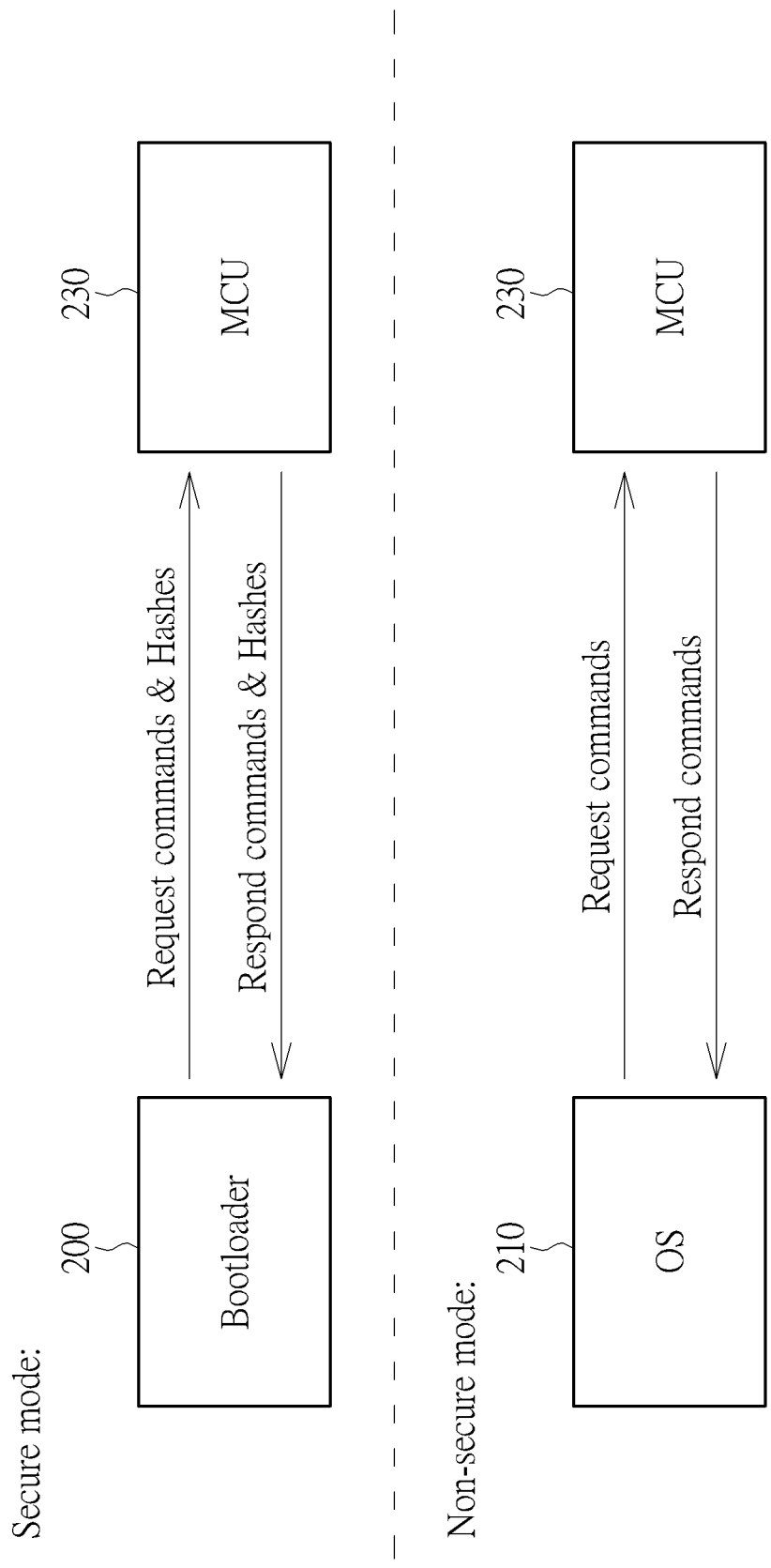
FIG. 4 is a schematic diagram of a secure mode and a non-secure mode of a computer system according to an example of the present invention.

FIG. 4 is a schematic diagram of a secure mode and a non-secure mode of a computer system according to an example of the present invention. In one example, the bootloader 200 transmits commands and hashes (e.g., the second plurality of hashes) to the MCU 230. The MCU 230 may identify that the commands are transmitted from the bootloader 200 due to the existence of the hashes (e.g., the second plurality of hashes). The computer system 20 enters a secure mode, and all commands (e.g., including acquiring the plurality of random bytes) from the bootloader 200 are available. In one example, the OS 210 transmits commands to the MCU 230. The MCU 230 may identify that the commands are transmitted from the OS 210 due to the lack of the hashes. The computer system 20 enters a non-secure mode, and only certain commands (e.g., not including acquiring the plurality of random bytes) from the OS 210 are available.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the computer system 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage device) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the computer system 20.

To sum up, the present invention provides a computer system for failing a secure boot in a case tampering event. When the case tampering event happens during the power failure of the computer system, the MCU deletes the random bytes stored in the MCU and the hardware according to the power supply. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer system for failing a secure boot in a case tampering event, comprising:
 a microcontroller unit (MCU);
 a bootloader, comprising a trusted platform module (TPM) which includes:
  a cryptographic processor, comprising:
   a random byte generator for generating a plurality of random bytes for a secure boot of the computer system; and
   a hash generator for generating a plurality of hashes according to the plurality of random bytes; and
  at least one hardware for storing the plurality of random bytes generated by the random byte generator and comprising:
   a platform configuration register (PCR) for generating a plurality of hashes according to a cryptographic hash function and the plurality of random bytes generated by the random byte generator;
 an operating system (OS), for performing the secure boot, wherein the secure boot of the computer system is completed if the plurality of hashes generated by the platform configuration register are the same as the plurality of hashes generated by the hash generator, and the secure boot of the computer system fails if the plurality of hashes generated by the platform configuration register are not the same as the plurality of hashes generated by the hash generator;

at least one sensor, coupled to the MCU, for detecting a case tampering event in the computer system, and transmitting a signal for triggering a deletion of the plurality of random bytes, if the case tampering event happens in the computer system; and the TPM completing the secure boot of the computer system according to the plurality of random bytes when determining that the deletion of the plurality of random bytes is not triggered;

wherein the MCU performs the operation of:
deleting the plurality of random bytes stored in the MCU and the at least one hardware according to a power supply, to fail the secure boot, in response to the signal transmitted by the at least one sensor; and wherein the bootloader further performs the operations of:
obtaining the plurality of random bytes for the secure boot according to a password of the computer system and the first plurality of hashes, after the case tampering event happens;
storing the plurality of random bytes in the MCU and the at least one hardware; and
resuming the secure boot according to the plurality of random bytes.

2. The computer system of claim 1, wherein the bootloader and the OS perform the secure boot according to the information stored in the MCU and the at least one hardware.

3. The computer system of claim 1, wherein the MCU further performs the operation of:
scrambling the plurality of random bytes stored in the at least one hardware, if the case tampering event does not happen in the computer system.

4. The computer system of claim 1, wherein the MCU communicates with the bootloader according to the plurality of random bytes and a second plurality of hashes.

5. The computer system of claim 4, wherein the second plurality of hashes comprises at least one SHA-1 value.

6. A method of failing a secure boot in a case tampering event of a computer system, comprising:
performing a secure boot of a computer system;
generating a plurality of random bytes for the secure boot using a trusted platform module (TPM), if a microcontroller unit (MCU) does not comprise the plurality of random bytes;
storing information generated by the TPM in the MCU and at least one hardware of the computer system, wherein the information generated by the TPM comprises the plurality of random bytes and the at least one hardware of the computer system comprises a platform configuration register (PCR);
generating a plurality of hashes according to the information stored in the at least one hardware by the PCR;
generating a first plurality of hashes according to the plurality of random bytes by a hash generator of the computer system;
detecting a case tampering event in the computer system;
transmitting a signal for triggering a deletion of the plurality of random bytes, if the case tampering event happens in the computer system;
deleting the plurality of random bytes stored in the MCU and the at least one hardware according to a power supply, to fail the secure boot, in response to the signal transmitted by the at least one sensor, wherein the secure boot of the computer system is completed if the plurality of hashes generated by the platform configuration register are the same as the plurality of hashes generated by the hash generator, and the secure boot of the computer system fails if the plurality of hashes generated by the platform configuration register are not the same as the plurality of hashes generated by the hash generator;
the TPM completing the secure boot of the computer system according to the plurality of random bytes when determining that the deletion of the plurality of random bytes is not triggered; and
obtaining the plurality of random bytes for the secure boot according to a password of the computer system and the first plurality of hashes, after the case tampering event happens;
storing the plurality of random bytes in the MCU and the at least one hardware; and
resuming the secure boot according to the plurality of random bytes.

7. The method of claim 6, wherein the secure boot is performed according to the information stored in the MCU and the at least one hardware.

8. The method of claim 6, wherein the method further comprises:
scrambling the plurality of random bytes stored in the at least one hardware by the MCU, if the case tampering event does not happen in the computer system.

9. The method of claim 6, wherein the method further comprises:
communicating with the computer system according to the plurality of random bytes and a second plurality of hashes.

10. The method of claim 9, wherein the second plurality of hashes comprises at least one SHA-1 value.

* * * * *